US011965553B2

(12) United States Patent
Roffe et al.

(10) Patent No.: US 11,965,553 B2
(45) Date of Patent: Apr. 23, 2024

(54) BEARING CAGE

(71) Applicant: SCHAEFFLER TECHNOLOGIES AG & CO. KG, Herzogenaurach (DE)

(72) Inventors: Dennis Roffe, Fort Mill, SC (US); Seth Claus, Fort Mill, SC (US); Guihui Zhong, Charlotte, NC (US); Charles Schwab, Fort Mill, SC (US); Arjun Kailassh Magalingam Adithyan, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 50 days.

(21) Appl. No.: 17/845,309

(22) Filed: Jun. 21, 2022

(65) Prior Publication Data
US 2023/0407919 A1    Dec. 21, 2023

(51) Int. Cl.
*F16C 33/46*    (2006.01)

(52) U.S. Cl.
CPC ...... *F16C 33/4676* (2013.01); *F16C 33/4605* (2013.01)

(58) Field of Classification Search
CPC .............. F16C 33/4605; F16C 33/4617; F16C 33/4623; F16C 33/4629; F16C 33/4635; F16C 33/467; F16C 33/4676; F16C 33/4682
See application file for complete search history.

(56) References Cited

U.S. PATENT DOCUMENTS

| 5,584,583 A | * | 12/1996 | Hidano | F16C 19/463 384/470 |
| 8,616,776 B2 | * | 12/2013 | Nakamura | F16C 33/4605 384/470 |
| 2016/0084311 A1 | * | 3/2016 | Dittmar | F16C 19/22 384/572 |

FOREIGN PATENT DOCUMENTS

JP    2004-144244    *    5/2004

* cited by examiner

*Primary Examiner* — James Pilkington
(74) *Attorney, Agent, or Firm* — Volpe Koenig

(57) ABSTRACT

A bearing cage for a bearing assembly is disclosed herein. The bearing cage includes a first ring, a second ring, and a plurality of crossbars extending between the first ring and the second ring to define a plurality of rolling element pockets. A first terminal end of each of the plurality of crossbars is connected to the first ring and a second terminal end of each of the plurality of crossbars is connected to the second ring. A medial portion of each of the plurality of crossbars is defined between the first terminal end and the second terminal end, and a pair of recesses are defined on opposing circumferential sides of the medial portion.

18 Claims, 5 Drawing Sheets

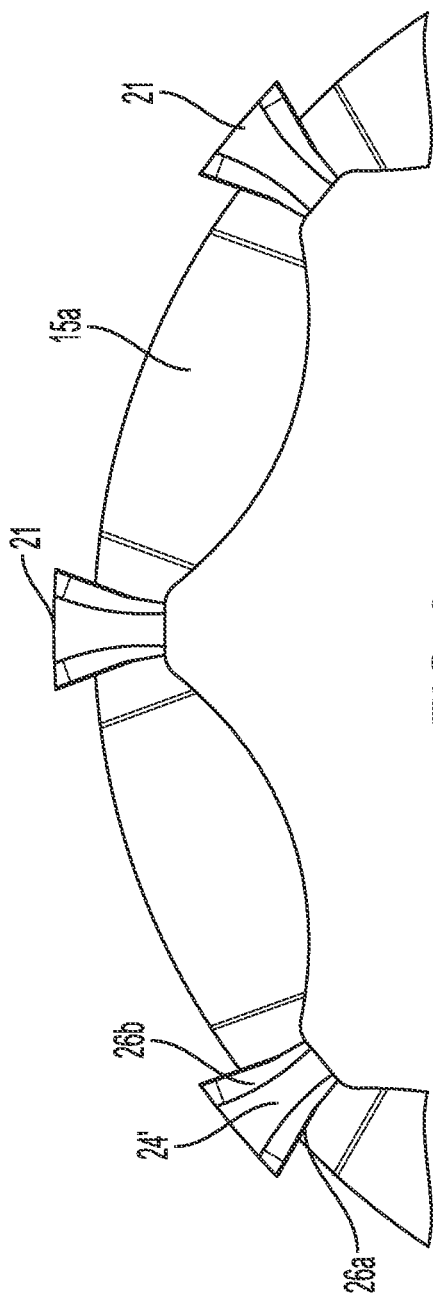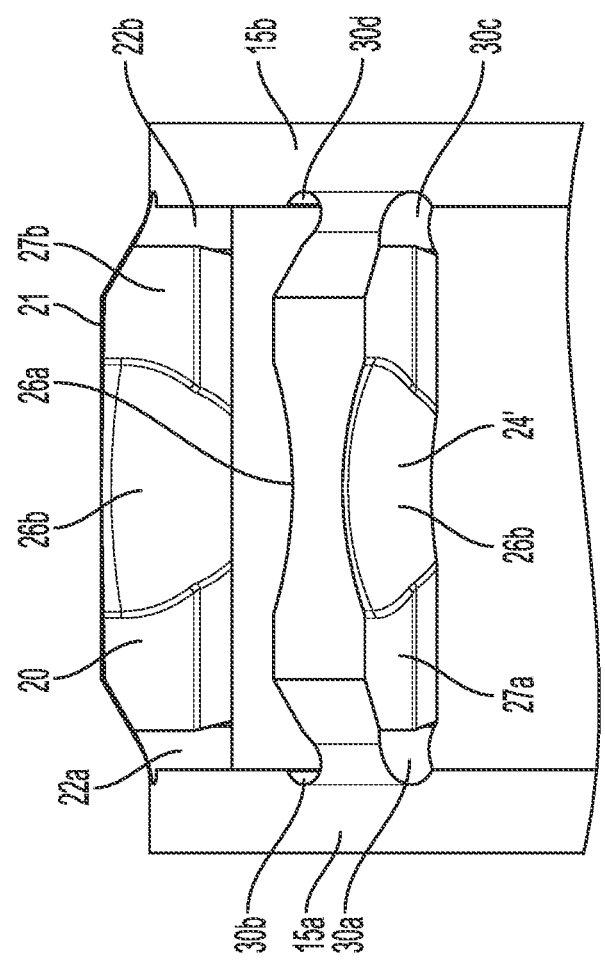

BEARING CAGE

FIELD OF INVENTION

The present disclosure relates to a bearing assembly, and more particularly relates to a bearing cage for the bearing assembly.

BACKGROUND

Bearing assemblies are well known and can include bearing cages for supporting rolling elements. The crossbars on bearing cages can undergo significant stress, especially in high speed applications. As the speed increases, friction losses can also increase, which is undesirable.

It would be desirable to provide a bearing cage that is suitable for use in high speed applications and that is more durable and capable of withstanding stresses, particularly on the crossbars of the bearing cage.

SUMMARY

A bearing cage for a bearing assembly is disclosed herein. The bearing cage can include a first ring, a second ring, and a plurality of crossbars extending between the first ring and the second ring to define a plurality of rolling element pockets. A first terminal end of each of the plurality of crossbars is connected to the first ring and a second terminal end of each of the plurality of crossbars is connected to the second ring. A medial portion of each of the plurality of crossbars is defined between the first terminal end and the second terminal end, and a pair of recesses are defined on opposing circumferential sides of the medial portion.

First and second rolling element guide portions can be defined on either axial side of each of the pair of recesses. Additionally, a guiding portion that extends radially outward relative to the first and second rings can be configured to engage an outer bearing ring and can be defined on at least the medial portion of the crossbars.

A first connection region can be defined at an intersection between the first terminal end of the plurality of crossbars and the first ring. The first connection region can include a first pair of indentations defined on either circumferential side of each crossbar of the plurality of crossbars.

A second connection region can be defined at an intersection between the second terminal end of the plurality of crossbars and the second ring. The second connection region can include a second pair of indentations defined on either circumferential side of each crossbar of the plurality of crossbars.

The first pair of indentations can be partially formed on both the plurality of crossbars and the first ring, and the second pair of indentations can be partially formed on both the plurality of crossbars and the second ring.

The crossbars can each have a first thickness (t1) defined at a medial point of the medial portion, and the plurality of crossbars can each have a second thickness (t2) defined at the first and second rolling element guide portions, and the first thickness (t1) can be less than the second thickness (t2).

The first and second rings can each include radially inward projections in an area defined between adjacent crossbars of the plurality of crossbars.

The first ring, the second ring, and the plurality of crossbars can each be formed integrally with each other. The bearing cage can be formed from plastic. One of ordinary skill in the art would understand that the bearing cage can be formed from other materials.

A radially inner side of each of the plurality of crossbars can have a flat profile in an axial direction. One of ordinary skill in the art would understand that the profile of the radially inner side of each of the crossbars can vary.

The profile of the bearing cage, and most specifically the crossbars, helps improve the stress conditions encountered by the bearing cage by moving the roller contact area away from the center of the crossbars and away towards the terminal ends.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 9 is a partial cross-sectional view of the bearing cage of FIG. 1.

FIG. 10 is a magnified top view of the bearing cage of FIG. 1.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
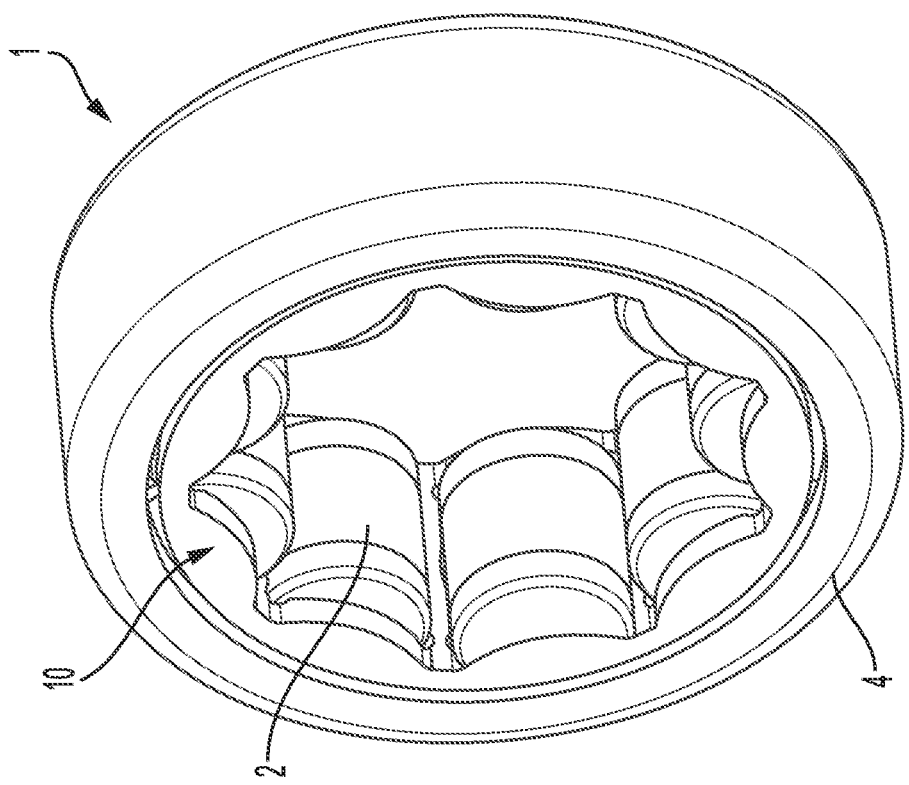
FIG. 1 is a perspective view of a bearing cage according to one example.
Figure 2:
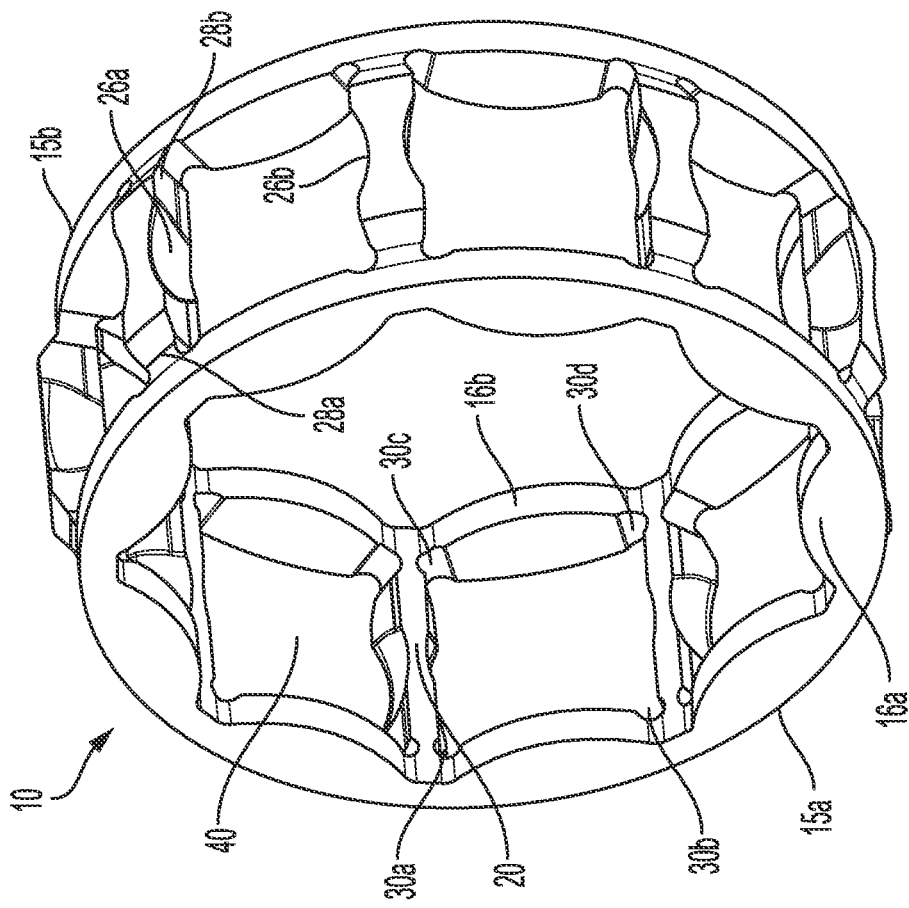
FIG. 2 is a perspective view of a bearing assembly including the bearing cage of FIG. 1.

As shown in FIG. 2, a bearing assembly 1 is disclosed herein that includes a bearing cage 10, which can be used in conjunction with a plurality of rolling elements 2 and an outer ring 4.

The bearing cage 10 includes a first ring 15a, a second ring 15b, and a plurality of crossbars 20 extending between the first ring 15a and the second ring 15b to define a plurality of rolling element pockets 40. The bearing cage 10 is shown without rolling elements 2 in FIGS. 1, 7, 8, 9, and 10, and is shown with rolling elements 2 in FIGS. 3, 4, 5, and 6.

A first terminal end 22a of each of the plurality of crossbars 20 can be connected to the first ring 15a and a second terminal end 22b of each of the plurality of crossbars 20 can be connected to the second ring 15b. A medial portion 24 of each of the plurality of crossbars 20 is defined between the first terminal end 22a and the second terminal end 22b. Each of the medial portions 24 defines a pair of recesses 26a, 26b on opposing circumferential sides. A profile of the recesses 26a, 26b can have a partially spherical profile. A first and second rolling element guide portion 27a, 27b can be defined on either axial side of each of the recesses 26a, 26b. In one example, the pair of recesses 26a, 26b each are wider at a radially outer portion of the plurality of crossbars 20 than at a radially inner portion of the plurality of crossbars 20. One of ordinary skill in the art would understand that the profile of the recesses 26a, 26b can vary.

Figure 7:
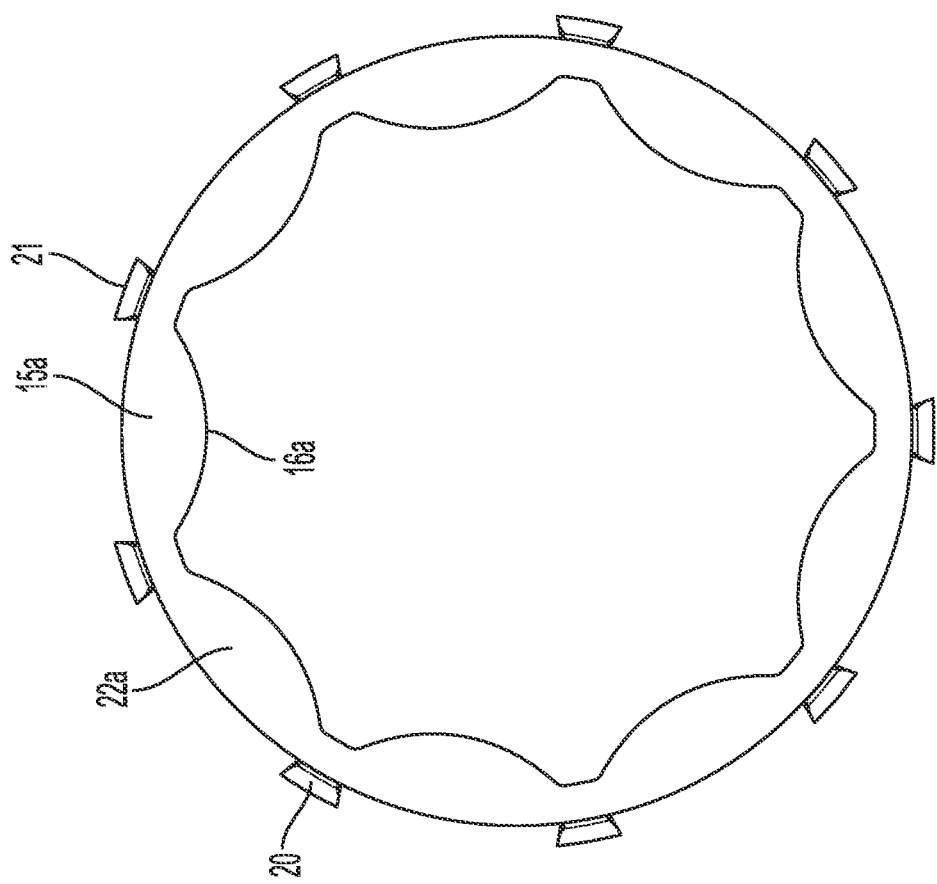
FIG. 7 is a front view of the bearing cage of FIG. 1.

As shown in at least FIG. 7, a guiding portion 21 of the medial portion 24 of the plurality of crossbars 20 can extend radially outward relative to the first and second rings 15a, 15b, and can be defined at end regions 24a, 24b of the crossbars 20 as well as the medial portion 24. The guiding portion 21 can be configured to engage with an outer ring 4, in one example.

Connection regions 28a, 28b can be defined at an intersection between (i) the first terminal end 22a of the plurality of crossbars 20 and the first ring 15a, and (ii) the second terminal end 22b of the plurality of crossbars 20 and the second ring 15b, and the plurality of connection regions 28a, 28b can each include indentations 30a, 30b, 30c, 30d.

A first connection region 28a can be defined at an intersection between the first terminal end 22a of the plurality of crossbars 20 and the first ring 15a. The first connection region 28a can include a first pair of indentations 30a, 30b defined on either circumferential side of each crossbar of the plurality of crossbars 20.

A second connection region 28b can be defined at an intersection between the second terminal end 22b of the plurality of crossbars 20 and the second ring 15b. The second connection region 28b includes a second pair of indentations 30d defined on either circumferential side of each crossbar of the plurality of crossbars 20.

The first pair of indentations 30a, 30b can be partially formed on both the plurality of crossbars 20 and the first ring 15a, and the second pair of indentations 30d can be partially formed on both the plurality of crossbars and the second ring Stated differently, each of the indentations 30a, 30b, 30c, 30d can have a portion that extends circumferentially into the crossbars 20 and axially into the first and second rings 15a, 15b. Each of the indentations 30a, 30b, 30c, 30d have a partially circular or spherical profile. A radius of each of the indentations 30a, 30b, 30c, 30d can be at least 1.0 mm.

Figure 8:
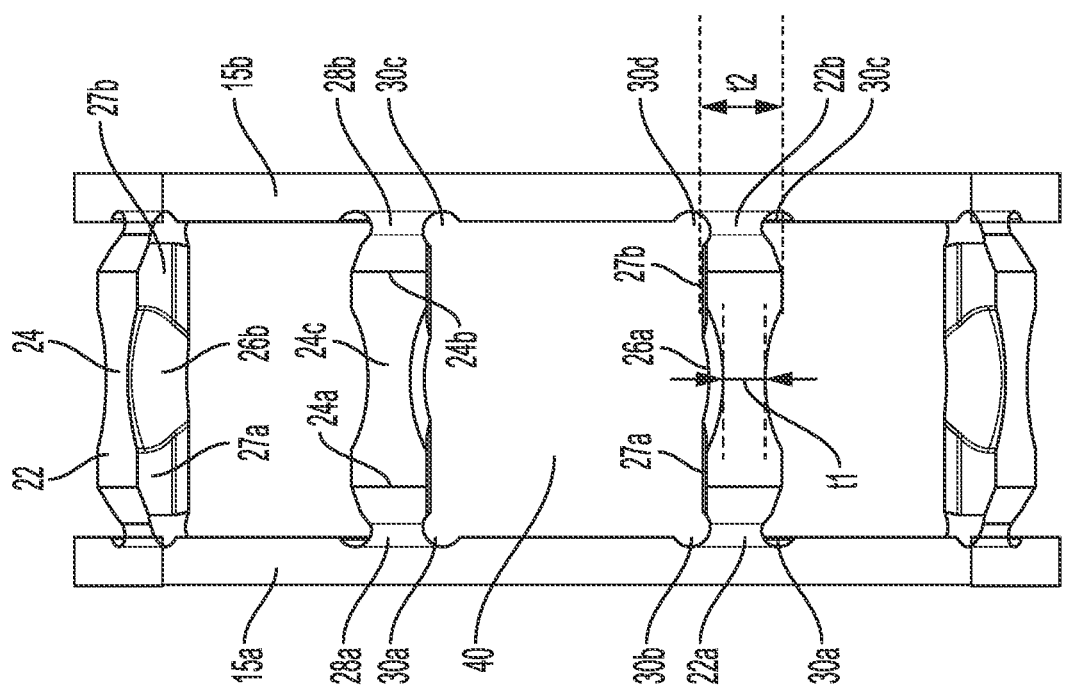
FIG. 8 is a top view of the bearing cage of FIG. 1.

The connection regions 28a, 28b can be thinner than at least a portion of the medial portion 24. As shown in FIG. 8, the medial portion 24 of the crossbars can be thicker in end regions 24a, 24b adjacent to the connection regions 28a, 28b, and thinner in medial region 24c.

The plurality of crossbars 20 can each have a first thickness (t1) defined at a medial point 24' of the medial portion 24, and the plurality of crossbars 20 can each have a second thickness (t2) defined at the first and second rolling element guide portion 27a, 27b, and the first thickness (t1) is less than the second thickness (t2). In one example, the crossbars 20 have a lowest thickness at the medial point 24' of the medial portion 24. The thickness of the crossbars 20 can fluctuate between the rings 15b.

The first and second rings 15a, 15b can each include radially inward projections 16a, 16b in an area defined between adjacent crossbars 20 of the plurality of crossbars 20. One of ordinary skill in the art would understand that the profile of the first and second rings 15a, 15b can vary.

The first ring 15a, the second ring 15b, and the plurality of crossbars 20 can each be formed integrally with each other. The bearing cage can be formed from plastic. One of ordinary skill in the art would understand that the bearing cage can be formed from other materials.

Figure 4:
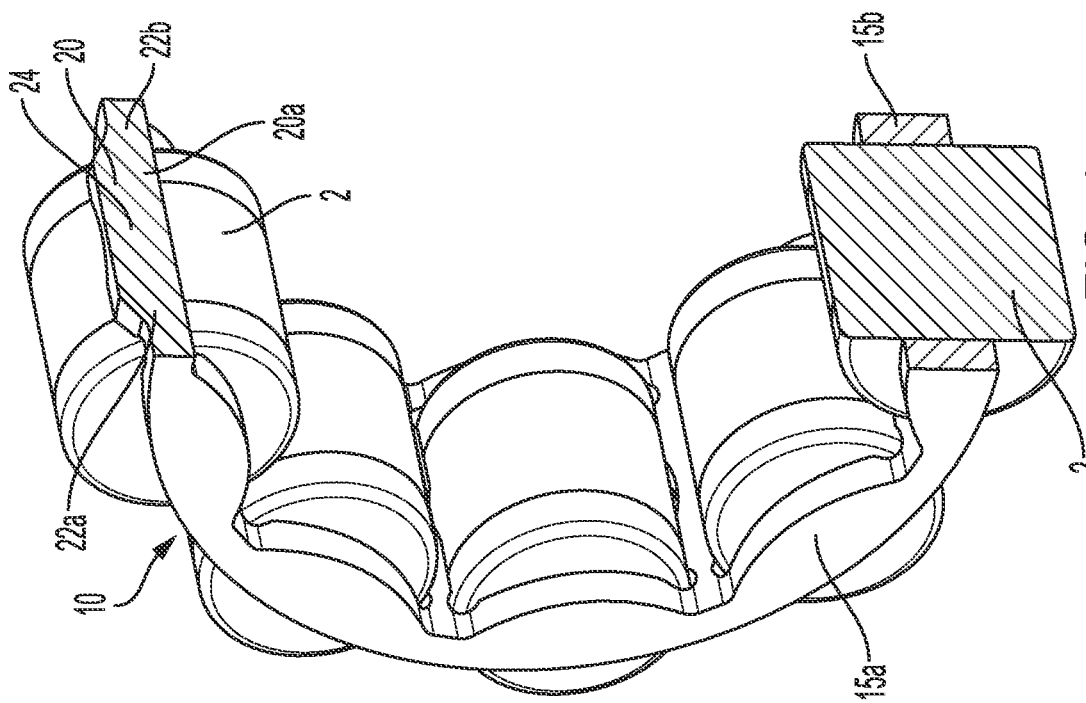
FIG. 4 is a perspective cross-sectional view of the arrangement of FIG. 3.
Figure 3:
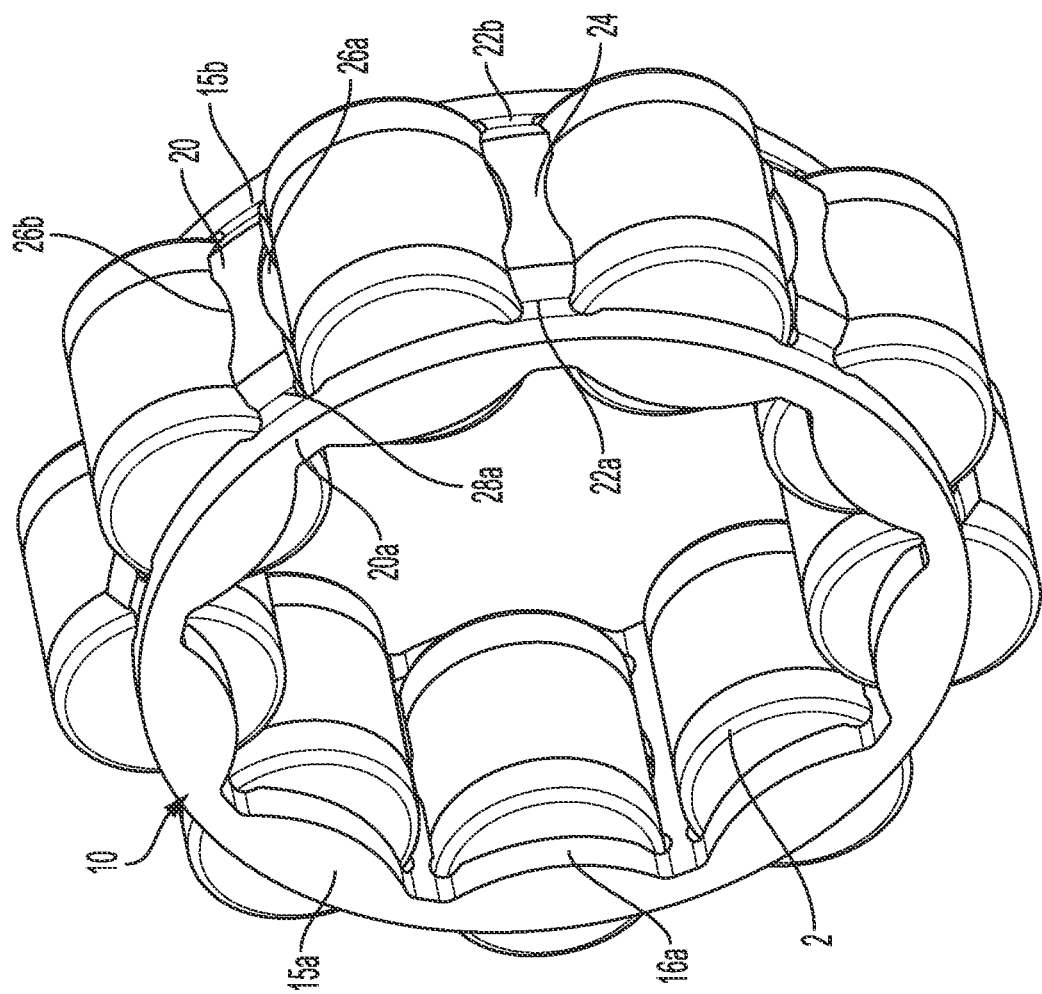
FIG. 3 is a perspective view of the bearing cage of FIGS. 1 and 2 with rolling elements arranged therein.
Figure 6:
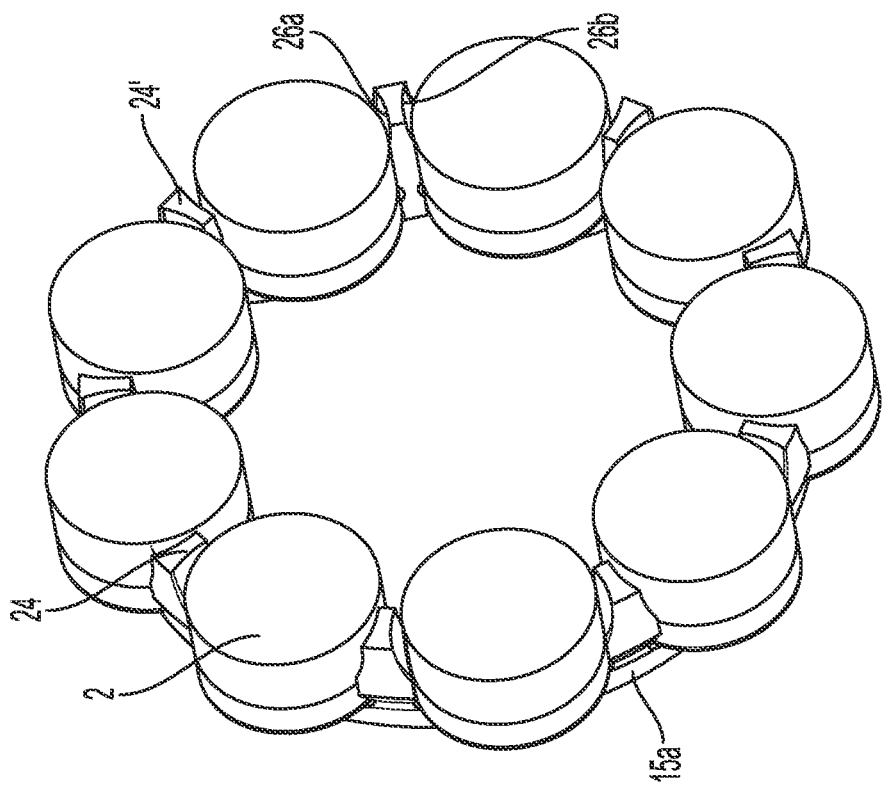
FIG. 6 is a perspective cross-sectional view of the arrangement of FIGS. 3-5.
Figure 5:
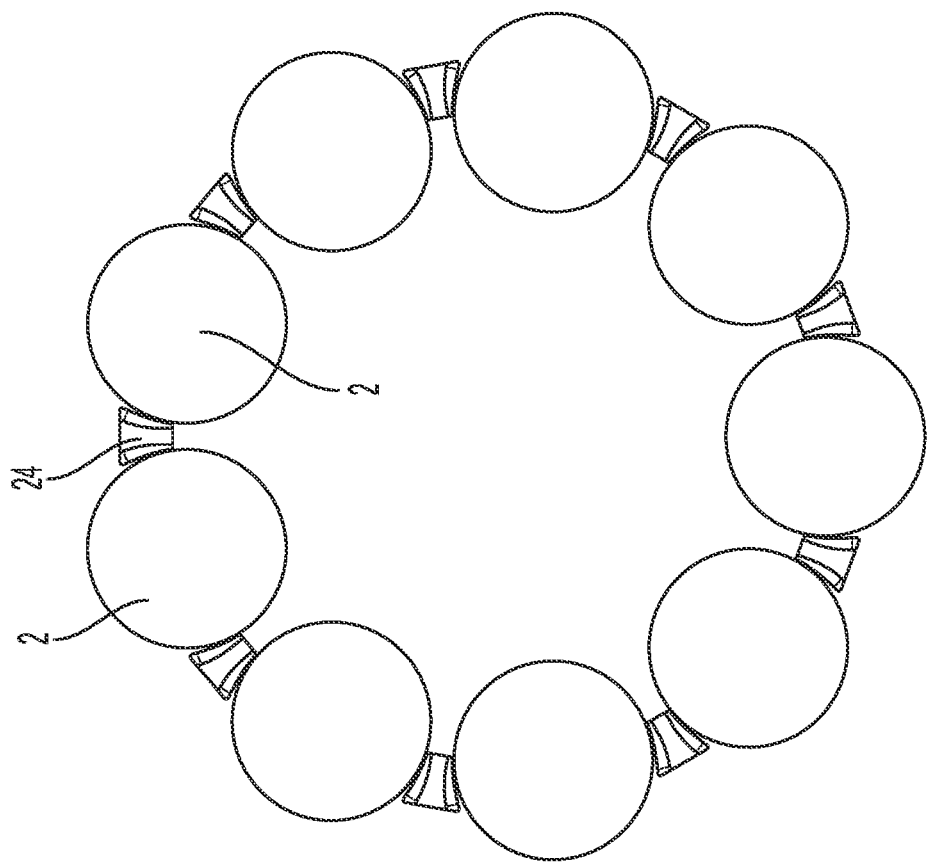
FIG. 5 is a front cross-sectional view of the arrangement of FIGS. 3 and 4.

A radially inner side 20a of each of the plurality of crossbars 20 can have a flat profile in an axial direction, as shown in FIG. 4. One of ordinary skill in the art would understand that the radially inner side 20a of the crossbars 20 can vary.

As disclosed herein, the bearing cage 10 provides an improved configuration for the crossbars 20 to flex and reduce the stress concentrations at the corners of the crossbars 20 and the rings 15a, 15b. The indentations 30a, 30b, 30c, reduce any extreme stresses that may otherwise occur at the connection regions 28a, 28b. The recesses 26a, 26b further improve the ability of the crossbars 20 to flex. Additionally, the bearing cage 10 can be used in high speed applications, such as at least 30,000 rpm applications.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS bearing assembly 1
rolling elements 2
outer ring 4
bearing cage 10
first ring 15a
second ring 15b
radially inward projections 16a, 16b of rings
crossbars 20
radially inner side 20a of crossbar
guiding portion 21 of crossbar
first terminal end 22a of crossbar
second terminal end 22b of crossbar
medial portion 24 of crossbar
end regions 24a, 24b of medial portion
medial region 24c of medial portion
medial point 24' of the medial portion
recesses 26a, 26b
rolling element guide portions 27a, 27b
connection regions 28a, 28b
indentations 30a, 30b, 30c, 30d
rolling element pockets 40

What is claimed is:
1. A bearing cage for a bearing assembly, the bearing cage comprising:
   a first ring;
   a second ring; and
   a plurality of crossbars extending between the first ring and the second ring to define a plurality of rolling element pockets;

wherein a first terminal end of each of the plurality of crossbars is connected to the first ring and a second terminal end of each of the plurality of crossbars is connected to the second ring;

wherein a medial portion of each of the plurality of crossbars is defined between the first terminal end and the second terminal end, and a pair of recesses are defined on opposing circumferential sides of the medial portion, the pair of recesses including a first recess on a first circumferential side of the medial portion and a second recess on a second circumferential side of the medial portion; and wherein the first and second rings each include radially inward projections in an area defined between adjacent crossbars of the plurality of crossbars.

2. The bearing cage according to claim 1, wherein a first and second rolling element guide portion are defined on either axial side of each of the pair of recesses.

3. The bearing cage according to claim 2, wherein the plurality of crossbars each have a first thickness (t1) defined at a medial point of the medial portion, and the plurality of crossbars each have a second thickness (t2) defined at the first and second rolling element guide portion, and the first thickness (t1) is less than the second thickness (t2).

4. The bearing cage according to claim 1, wherein the bearing cage further comprises a guiding portion that extends radially outwards and is defined on the medial portion of the plurality of crossbars and end regions of the plurality of crossbars.

5. The bearing cage according to claim 1, wherein a first connection region is defined at an intersection between the first terminal end of the plurality of crossbars and the first ring, and the first connection region includes a first pair of indentations defined on either circumferential side of each crossbar of the plurality of crossbars, wherein the first pair of indentations includes a first indentation on a first circumferential side of each crossbar and a second indentation on a second circumferential side of each crossbar.

6. The bearing cage according to claim 5, wherein a second connection region is defined at an intersection between the second terminal end of the plurality of crossbars and the second ring, and the second connection region includes a second pair of indentations defined on either circumferential side of each crossbar of the plurality of crossbars, wherein the second pair of indentations includes a first indentation on a first circumferential side of each crossbar and a second indentation on a second circumferential side of each crossbar.

7. The bearing cage according to claim 6, wherein the first pair of indentations are partially formed on both the plurality of crossbars and the first ring, and the second pair of indentations are partially formed on both the plurality of crossbars and the second ring.

8. The bearing cage according to claim 6, wherein the first and second pair of indentations each have a partially circular profile.

9. The bearing cage according to claim 1, wherein the first ring, the second ring, and the plurality of crossbars are formed integrally with each other.

10. The bearing cage according to claim 1, wherein the bearing cage is formed from plastic.

11. The bearing cage according to claim 1, wherein a radially inner side of each of the plurality of crossbars has a flat profile in an axial direction.

12. The bearing cage according to claim 1, wherein the pair of recesses each are wider at a radially outer portion of the plurality of crossbars than at a radially inner portion of the plurality of crossbars.

13. A bearing cage for a bearing assembly, the bearing cage comprising:

a first ring;

a second ring;

a plurality of crossbars extending between the first ring and the second ring to define a plurality of rolling element pockets, wherein a first terminal end of each of the plurality of crossbars is connected to the first ring and a second terminal end of each of the plurality of crossbars is connected to the second ring, a plurality of indentations each defined on both circumferential sides of each of the plurality of crossbars at respective connection regions defined at an intersection between the first terminal end of the plurality of crossbars and the first ring, and at an intersection between the second terminal end of the plurality of crossbars and the second ring; and a medial portion of each of the plurality of crossbars defined between the first terminal end and the second terminal end, wherein a pair of recesses are defined on opposing circumferential sides of the medial portion, the pair of recesses including a first recess on a first circumferential side of the medial portion and a second recess on a second circumferential side of the medial portion;

wherein the pair of recesses each are wider at a radially outer portion of the plurality of crossbars than at a radially inner portion of the plurality of crossbars.

14. The bearing cage according to claim 13, wherein a first and second rolling element guide portion are defined on either axial side of each of the pair of recesses.

15. The bearing cage according to claim 14, wherein the plurality of crossbars each have a first thickness (t1) defined at a medial point of the medial portion, and the plurality of crossbars each have a second thickness (t2) defined at the first and second rolling element guide portion, and the first thickness (t1) is less than the second thickness (t2).

16. The bearing cage according to claim 13, wherein the first ring, the second ring, and the plurality of crossbars are formed integrally with each other, and the bearing cage is formed from plastic.

17. The bearing cage according to claim 13, wherein each of the plurality of indentations are partially formed on both the plurality of crossbars and at least one of the first ring or the second ring.

18. A bearing cage for a bearing assembly, the bearing cage comprising:

a first ring;

a second ring; and a plurality of crossbars extending between the first ring and the second ring to define a plurality of rolling element pockets;

wherein a first terminal end of each of the plurality of crossbars is connected to the first ring and a second terminal end of each of the plurality of crossbars is connected to the second ring;

wherein a medial portion of each of the plurality of crossbars is defined between the first terminal end and the second terminal end, wherein a pair of recesses are defined on opposing circumferential sides of the medial portion, the pair of recesses including a first recess on a first circumferential side of the medial portion and a second recess on a second circumferential side of the medial portion; and wherein the pair of recesses each are wider at a radially outer portion of the plurality of crossbars than at a radially inner portion of the plurality of crossbars.

\* \* \* \* \*